March 1, 1949.  J. M. KEMPER  2,463,491
CABIN PRESSURE REGULATOR
Filed Oct. 2, 1944  2 Sheets-Sheet 1

Inventor
JAMES M. KEMPER
By
Attorney

Patented Mar. 1, 1949

2,463,491

UNITED STATES PATENT OFFICE 2,463,491

CABIN PRESSURE REGULATOR

James M. Kemper, Hollywood, Calif., assignor to The Garrett Corporation, Airesearch Manufacturing Company division, Los Angeles, Calif.

Application October 2, 1944, Serial No. 556,790

17 Claims. (Cl. 98—1.5)

This invention relates in general to the pressurizing of aircraft cabins and, while it is applicable to various methods of pressurizing, it has particular applicability to the method in which the cabin pressure is permitted to remain substantially the same as atmospheric pressure until a predetermined altitude has been reached, is maintained at a substantially constant level between that altitude and a second predetermined and higher altitude and, above said second predetermined altitude, is maintained at a substantially fixed differential relative to external atmosphere. There are well recognized advantages in controlling the cabin pressure in this manner, but the earlier forms of apparatus by which it was proposed to effectuate the method have been fairly complicated in construction and difficult to maintain in good operating condition. Having in view the general object of implementing this or other methods without incurring these difficulties, the invention has, among its objects, to provide a pressure regulator which:

1. Is of simple and inexpensive construction;
2. Is very light in weight so as to add very little to the weight of the plane in which it is installed;
3. Is dependable in operation irrespective of its position with reference to the horizontal, and may be mounted in any position, with its axis disposed horizontally, vertically, or angularly, without its operation being impaired;
4. May be provided in the form of a self-contained unit, completely assembled, requiring no external connection in its installation in an airplane, and capable of being furnished as a packaged article;
5. In not affected by dirt, oil, water, or moisture;
6. Eliminates the follow-up system, common to most regulators, and is thereby held to much closer limits of operation;
7. Has no close tolerances requiring precise machining operations;
8. Provides a smooth transition from unpressurized to pressurized operation, regardless of the rate of climb;
9. Provides for emergency relief of cabin pressure where required;
10. Is capable of operation in connection with electrical or other types of warning signals for indicating the event of the pressure falling below a certain predetermined value;
11. Is capable of operation in conjunction with a device for adjusting the cabin pressure to correspond to that existing at the altitude of a landing field.

Toward the attainment of the foregoing objects, the invention contemplates a pressure regulator embodying valve means of ample capacity to handle the outflow of air from the cabin under all conditions of operation, operated by a means which is responsive to the differential between the pressure of the air being passed by said valve means and the air in a control chamber which is under the control of pressure sensitive valve means which, in its controlling operation, is required to handle only a small quantity of air as compared to that handled by the flow control valve.

Further objects and advantages of the invention will be brought out in the following part of the specification.

Referring to the drawings which are for illustrative purposes only,

Figure 1:
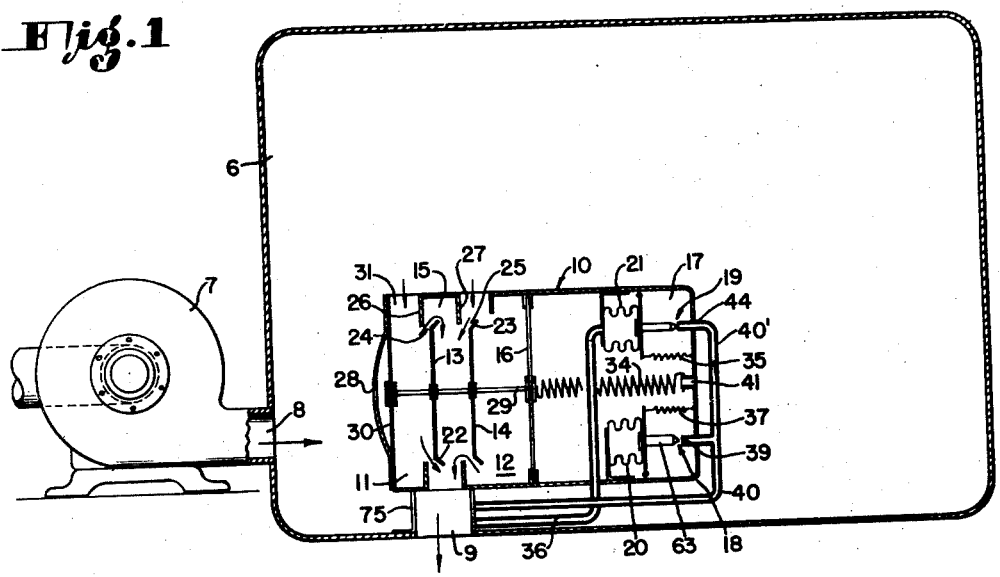
Fig. 1 is a schematic showing of a pressurized cabin involving the invention.
Figure 2:
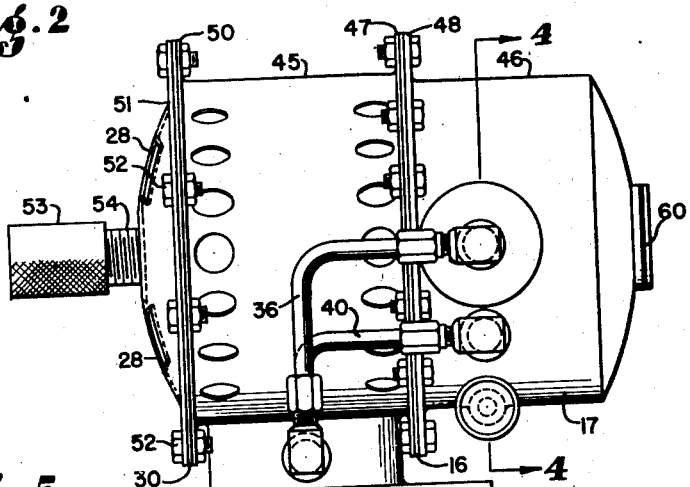
Fig. 2 is a side elevation of the regulator unit.

As an example of one form in which the invention may be embodied, I have shown in the drawings an aircraft cabin pressurizing arrangement in which the air under pressure is delivered to the cabin 6 by a supercharger, conventionally indicated at 7, through an inlet 8 and the pressure within the cabin 6 is controlled by controlling the escape of air from the cabin through an outlet 9 by means of a regulator unit 10 embodying the invention.

The regulator 10 embodies spaced annular chambers 11 and 12 which provide parallel paths for the flow of air from the cabin past balanced valves 13 and 14 into an intermediate chamber 15, from which it may escape to the outlet 9. The valves 13 and 14 are of ample size to handle the outflow of air from the cabin under all operating conditions. The flow valves 13 and 14 are actuated by a pressure differential responsive means in the form of a diaphragm 16 which responds to the differential existing between cabin pressure, exerted against the left side thereof (as viewed in Fig. 1), and the pressure in a control chamber 17, against the right side thereof. The pressure in the chamber 17 in turn is controlled by either of the pilot valves 18 and 19 adapted to bleed excess pressure from the chamber 17, the valves 18 and 19 being actuated by a pressure sensitive bellows 20 and 21 respectively. The pressure in the chamber 17 is controlled and maintained at a substantially constant pressure throughout the isobaric range while the bellows 21 is adapted to maintain a substantially constant differential between the pressure in chamber 17 and atmosphere above the isobaric range.

The valves 13 and 14 are mounted on a shaft 29 which in turn is fixed to and suspended between the diaphragms 16 and 30. As a result of this type of mounting, the movement of the valves is of a floating character, completely free from frictional resistance. The valves are in the form of light sheet metal discs having very little inertia. The diaphragm 16 has a dash-pot action in the chamber 17. Consequently, the valves are not affected to any appreciable extent by maneuvering of the airplane. The valves have conical rims 22, 23, adapted to co-act with the edges of circular openings 24, 25, in partition walls 26, 27, to define the valve openings. Since it is not necessary that the valves 13 and 14 make sealing contact with their seats during operation (constant flow for ventilation purposes being contemplated), precision finishing of the rim portions 23 is not necessary.

The effect upon the valve 13 of the airstream flowing from the chamber 11 into the chamber 15 is balanced by the effect, against the valve 14, of the oppositely directed airstream flowing from the chamber 12 into the chamber 15. Consequently, the valves 13 and 14 are not per se responsive to pressure or airflow, and are not affected by changes therein.

Because of the extreme light weight of the valves 13 and 14, and because there are no other parts which depend for proper operation upon a certain positioning with reference to the horizontal, the unit may be installed in any position, with its axis disposed horizontally, vertically or angularly, and will operate just as efficiently in one position as another.

Figure 5:
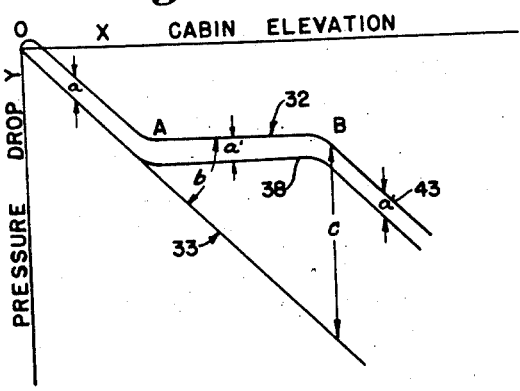
Fig. 5 is a graph showing the cabin pressure curve developed by the invention.

The regulator 10 correlates the flow through the outlet 9 with the inflow from the supercharger 7 so as to maintain cabin pressure in accordance with the curve 32 of Fig. 5, ambient or external atmospheric pressure being indicated by the curve 33 so as to show the relation between the latter and the cabin pressure. In the graph altitudes are indicated by the abscissas measured along the axis X and pressures are indicated by the ordinates along the axis Y. The control of cabin pressures by the regulator unit 10 is accomplished as follows:

The valves 13 and 14 are urged toward closed position by the combined pressure of a spring 34 and the air in the chamber 17, and toward open position by the cabin pressure exerted against the diaphragm 16. The pressure in the chamber 17 is in turn controlled by the valves 18 and 19. The valve 19 is held closed by a spring 35 acting through the lever 73 and stem 70, the bellows 21 thereof being in a neutral state owing to the balancing of the pressure in the chamber 17, acting externally thereof against the substantially equal pressure within the bellows, established through a tube 36 by means of which the interior of the bellows 21 communicates with the cabin outlet 9. Thus it will be seen that the pressure control means including the valve 19, spring 35, lever 73, stem 63, and bellows 21, constitute means responsive to differential pressure for controlling the pressure in the control chamber. The valve 18 is held open, against the pull of a spring 37 acting through the lever 66 and stem 63, by the collapsing of the bellows 20 under the pressure in the chamber 17, the interior of the bellows 20 being evacuated. This pressure control means including the valve 18, spring 37, lever 66, stem 63, and bellows 20, constitutes a means responsive to the pressure in the control chamber for controlling the pressure within the control chamber.

When the supercharger 7 is not operating, the valves 13 and 14 will be held closed by the spring 34. The operation of the supercharger creates a head of pressure in the cabin 6, which, acting against the diaphragm 16, will overcome the pressure of the spring 34 and open the valves 13 and 14 to permit the air to circulate through the cabin and discharge through the outlet 9 as indicated by the arrows in Fig. 1. This head of pressure, or differential in cabin pressure over external atmospheric pressure, is indicated at $a$ in Fig. 5.

At take-off altitudes, cabin pressure, acting against the diaphragm 16, is balanced against the pressure in the chamber 17 plus the pressure of the spring 34. As the airplane ascends, ambient pressure will gradually drop, as indicated by the curve 33. As the ambient pressure drops, there will be a corresponding drop in pressure in the chamber 17, as a result of escape of the air therefrom through an orifice 39 (constituting the seat of the valve 18) and a tube 40 to the cabin outlet 9. Air may enter the chamber 17 from the cabin through an orifice 41 which is smaller than the orifice 39, so that the pressure in the chamber 17 will correspond to ambient pressure as long as the valve 18 remains open. Throughout this stage of operation, the differential $a$ between cabin pressure and ambient pressure will be maintained as indicated by the spaced parallel relationship between the curve 33 and the portion O—A of the curve 32 in Fig. 5.

When the airplane, in its ascent, approaches the altitude which has been established as the limit at which the drop in cabin pressure corresponding to ambient pressure shall be arrested (which altitude, indicated at A on the graph, may be, for example 8000′), the pressure in the chamber 17 which has previously maintained the bellows 20 collapsed, will be reduced sufficiently to permit the spring 37 to overcome such collapsing pressure and move the valve 18 toward closed position, arresting the escape of air through the orifice 39 and causing the pressure in the chamber 17 to approach cabin pressure as the ambient pressure continues to drop, reducing the differential $a$ in cabin pressure over ambient pressure and causing the valves 13 and 14 to move toward closed position. This will result in restriction of the outflow, a corresponding increase in the differential in cabin pressure over ambient pressure, and a corresponding further closing movement of the valves 13 and 14, as the ambient pressure continues to drop. This stage of operations involves a build up of the pressure differential between cabin and ambient pressure to a point where the valves 13 and 14 have been closed sufficient to stabilize cabin pressure and the pressure in the chamber 17 at a substantially constant level preceded by a gradual tapering off of cabin pressure drop as indicated by the smooth portion of the curve (at A) joining the declining portion 38 thereof to the isobaric portion A—B thereof. There is thus achieved a slow, smooth, "take-over" from the unpressurized stage of operations to the isobaric stage, regardless of the rate of climb.

The isobaric stage is characterized by the maintenance of cabin pressure at a substantially constant level (as indicated by the portion A—B of the absolute pressure sensitive bellows 20. Any tendency of cabin pressure to increase above the isobaric level will result in a slight opening of the valve 18, followed by a slight drop in pressure in the chamber 17 and a corresponding slight opening of the valves 13 and 14, which will permit the cabin pressure to drop back to the isobaric level. Throughout this second stage of operation, there will be maintained a differential $a'$ (corresponding to the differential $a$ of the first stage) in cabin pressure over the pressure in the chamber 17, the latter pressure being indicated by the curve 38. The differential $a$, $a'$ will be maintained as long as the supercharger is in operation, and will maintain the valves 13 and 14 at a uniform degree of opening, thereby permitting the volume of air passing through the outlet to gradually increase in compensation for the reduction in density thereof with increasing altitude.

As the ambient pressure continues to drop, the resulting increase in differential of cabin over ambient pressure (indicated by the angle $b$ in the graph) will exert an increasing tendency to collapse the bellows 21 (the interior of which is subject to the decreasing ambient pressure through the tube 33), and when a second predetermined altitude (for example, 30,000', indicated at B in the graph) is reached, the pressure against the bellows 21 will overcome the pull of the spring 35 and open the valve 19. The opening of the valve 19 establishes communication between the chamber 17 and the cabin outlet 9 through an orifice 44 (constituting the seat of the valve 19), a tube 40' and the tube 40, thus reducing the pressure in the chamber 17 and causing the valves 13 and 14 to move in an opening direction, increasing the outflow of air through the outlet 9 sufficiently to substantially stabilize the differential of cabin over ambient pressure at the value $c$ and cause the cabin pressure to thereafter drop, as indicated at 43 in the graph, at a rate substantially corresponding to ambient pressure drop.

Figure 3:
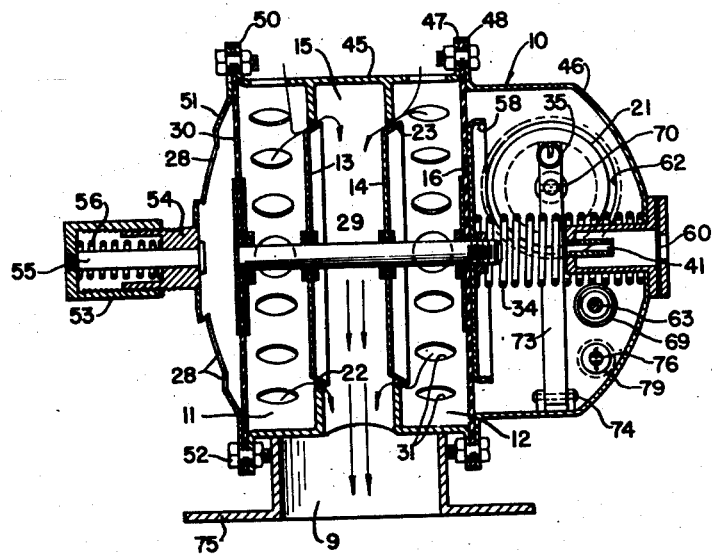
Fig. 3 is a longitudinal sectional view of the regulator unit.
Figure 4:
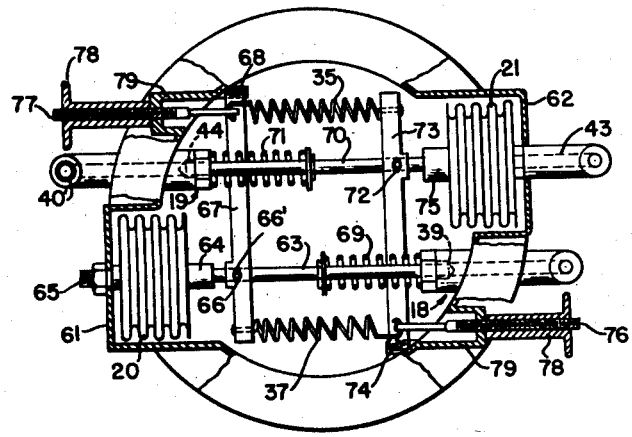
Fig. 4 is a transverse sectional view of the regulator unit taken on the line 4—4 of Fig. 2.

Considering now the constructional features of the regulator, and referring particularly to Figs. 3 and 4, the chambers 11, 12, and 15 are defined by a cylindrical casing section 45, the partition walls 26 and 27, and the diaphragms 16 and 30. The chamber 17 is defined between the diaphragm 16 and a cap 46. The cylindrical casing section 45 and the cap 46 have cooperating out-turned flanges 47 and 48, which are secured together by suitable securing elements, preferably of a removable type such as bolts 49. The diaphragm 16, which is of sheet rubber or equivalent material, is clamped between the flanges 47 and 48. The diaphragm 30, which is likewise of sheet rubber or equivalent material, is clamped between a flange 50 on the casing section 45 and an end plate 51 which is secured to the flange 50 as by means of bolts 52. Cabin pressure is applied to the outer side of the diaphragm 30 through the openings 28 in the end plate 51, which openings also function to permit unrestrained air movment into and out of the space between the diaphragm 30 and the end plate 51 as the diaphragm is flexed.

Manually controlled dump valve operation is provided for by a nut 53, threaded on a nipple 54 in the plate 51 and having a stem 55 adapted, when the nut is screwed toward the end plate 51, to engage the end of the shaft 29 and move the latter in valve opening direction against the resistance of the spring 56.

The orifice 41 is formed in the inner end of a nipple 57 mounted in the cap 46 and forming a pilot stud for locating one end of the spring 34.

The other end of the spring 34 is engaged against one of a pair of washers 58 and 59, by means of which the inner region of the diaphragm 16 is clamped to the shaft 29. The outer open end of the nipple 57 is covered by a filtering membrane 60 which cleans the air entering the chamber 17.

Dash pot action of the diaphragm 16 in the chamber 17 is provided for by the orifice 41, which is sufficiently restricted as to permit the diaphragm 16 to change position only with a relatively slow and steady motion, either in valve closing direction, under the pressure of the spring 34 in response to a sudden increase in pressure in the chamber 17 (resulting from closing of the valve 18 or valve 19) or in valve opening direction, under the effect of a sudden increase in the effective pressure against the diaphragm in response to a reduction in pressure in the chamber 17 (resulting from opening of the valve 18 or the valve 19).

The bellows 20 and 21 are mounted respectively in cylindrical housing members 61 and 62 in the annular wall of the cap 46. The valve 18 embodies a stem 63 which is attached to a boss 64 on the free end of the bellows 20 (the other end of the bellows being provided with a stud 65 by means of which it is secured in the end wall of the casing member 61). The valve stem 63 has trunnions 66 engaged in slots 66' in the lever 67, one end of which is pivoted at 68 to the cap 46 and the other end of which is engaged by the tension spring 37. The valve stem 63 is urged in valve opening direction by a coil spring 69. Similarly, the valve 19 embodies the stem 70 which cooperates with the orifice 44. The other end of the stem 70 is pivoted at 72 to the lever 73 which is subject to the pull of the spring 35, the end of the lever 73 opposite the end engaged by the spring 35 being pivoted at 74 to the cap 46, in a manner similar to the pivoting at 66, 66'. The stem 70 is secured in a boss 74 on the free end of the bellows 21, the other end of which attached to a tube 43. The stem 70 is urged in valve opening direction by a coil spring 71.

The ends of the springs 35 and 37 respectively opposite the ends which engage the levers 67 and 73 are anchored to adjusting screws 76 and 77 respectively, each of these adjusting screws being engaged by a threaded knob 78 which engages a boss 79, formed in the cap 46, and through which the respective adjusting screws are slidably extended. Adjustment of the tension of the spring 37 serves to adjust the isobaric pressure level, while adjustment of the spring 35 functions to adjust the pressure differential $c$.

Secured to the casing wall 45 is a flanged outlet member 75 by means of which the regulator unit may be attached to the wall of the cabin in communication with the cabin outlet 9.

The differential in pressure which controls the valve movement may be taken either as the differential between the two sides of the diaphragm 16, or the differential between the pressure in the chamber 17 against the right side of the diaphragm 16 and cabin pressure exerted through the openings against the left side of the diaphragm 30. In the former case, the pressures against the respective sides of the diaphragm 30 may be considered as being balanced against each other, while in the latter case the pressure against the left side of the diaphragm 16 may be considered as balancing the pressure against the right side of the diaphragm 30 (as viewed in Fig. 1). In such balancing of pressures, the effect of flow on the pressure in the chamber 11 is balanced by the opposite effect of flow in the chamber 12, and the operative differential is between static cabin pressure and static pressure in the chamber 17. However, the purpose of the diaphragm 30 is to support one end of the shaft 29 without offering any resistance, either frictional (as would be present in a bearing slidably supporting the shaft 29) or otherwise, and the diaphragm 16 would function substantially in the same manner if the diaphragm 30 were eliminated. Accordingly, the operation has, in the preceding specification, been described in terms of an operative differential between pressure acting against the opposite sides of the single diaphragm 16.

It may now be noted that the invention provides a self contained regulator unit, capable of being handled and sold as a package article and which, when installed in a cabin equipped with supercharging means for delivering air thereinto under pressure, will regulate the cabin pressure in accordance with a predetermined formula.

I claim as my invention:

1. Mechanism for controlling the pressure of the atmosphere within an aircraft cabin provided with an outlet opening, comprising: a valve for said outlet opening for controlling the flow therethrough and thereby controlling the pressure of the cabin atmosphere; means defining a control chamber, one wall of which comprises a pressure responsive element spaced from but operatively connected to said valve for operating the same in response to changes in differential between the pressure in said chamber, acting against one side of said element and cabin pressure acting against the other side of said element, said chamber defining means having a restricted aperture for bleeding of cabin air into said chamber; means for controlling the pressure in said chamber including a valve providing for controlled escape of air from said chamber to a region of lower pressure; and means responsive to the pressure in said chamber for operating the last named valve.

2. Mechanism for controlling the pressure of the atmosphere within an aircraft cabin provided with an outlet opening, comprising: a valve for said outlet opening for controlling the flow therethrough and thereby controlling the pressure of the cabin atmosphere; means defining a control chamber, one wall of which comprises a pressure responsive element spaced from but operatively connected to said valve for operating the same in response to changes in differential between the pressure in said chamber, acting against one side of said element and cabin pressure acting against the other side of said element, said chamber defining means having an aperture for limited bleeding of cabin air into said chamber; means connecting the chamber with a region of lower pressure; means for controlling the pressure in said chamber including a valve providing for controlled escape of air from said chamber to said region of lower pressure; and means responsive to a differential between the pressure in said chamber and ambient pressure, for operating said valve.

3. Mechanism for controlling the pressure of the atmosphere within an aircraft cabin provided with an outlet opening, comprising: a valve for said outlet opening for controlling the flow therethrough and thereby controlling the pressure of the cabin atmosphere; means defining a control chamber, one wall of which comprises a pressure responsive element spaced from but operatively connected to said valve for operating the same in response to changes in differential between the pressures in said chamber, acting against one side of said element and substantially cabin pressure acting against the other side of said element, said chamber defining means having an aperture for bleeding of cabin air into said chamber; and means for controlling the pressure in said chamber, including a pair of valves providing for controlled escape of air from said chamber to a region of lower pressure and a pair of pressure responsive elements for controlling said valves, one of said elements being sensitive to changes in the absolute pressure in said control chamber and the other of said elements being sensitive to changes in the differential between said control chamber pressure and ambient pressure.

4. Mechanism for controlling the air pressure in a cabin including: cabin pressure control means operable to control the pressure in said cabin, said pressure control means including a pressure sensitive element and a valve, said pressure sensitive element and said valve being spaced from each other but being operatively connected together; a control chamber, said pressure sensitive element being exposed both to cabin pressure and control chamber pressure in such a manner that changes in either of said pressures causes a movement of said pressure sensitive element whereby said valve of said cabin pressure control means is operated to control said cabin pressure; means providing air flow into said control chamber from a source of higher pressure; means connecting said control chamber to a lower pressure region; and means responsive to control chamber pressure for controlling the escape of air from said control chamber through said connecting means for controlling the pressure in said control chamber.

5. In a mechanism for controlling the pressure of fluid in an enclosure having an outlet for the escape of said fluid: a valve for controlling the flow of fluid through said outlet; a diaphragm and a flexible support member between which said valve is mounted for floating movement in unison with the movement of said diaphragm; means cooperating with said diaphragm to define a control chamber, said diaphragm being responsive to the differential between the pressure in the control chamber, exerted against one side thereof, and the pressure in said enclosure exerted against the other side thereof; means connecting the control chamber with a source of pressure; and pressure sensitive means, including means directly responsive to the pressure in said control chamber in one range of pressures, and means responsive to the differential of pressure in said control chamber over pressure outside of said enclosure in another range of pressures, for controlling the pressure in said control chamber.

6. In a mechanism for controlling the flow of fluid from a region of higher pressure to a region of lower pressure, there being a passage for the flow of fluid between said regions: a valve for controlling the flow of fluid through said passage; diaphragm means spaced from but operatively connected to said valve for transmitting movement thereto, one side of said diaphragm means being exposed to the pressure of said region of higher pressure; means cooperating with the other side of said diaphragm means to define a control chamber; means, including an orifice, permitting limited flow of fluid into said control chamber from a region of higher pressure; duct means connecting said control chamber with said source of lower pressure; means sensitive to pressure in said control chamber for controlling said duct so as to normally maintain a substantially constant pressure in said control chamber; and spring means biasing said valve toward the closed position, said spring means being adapted to yield to permit said differential in pressure to open said valve.

7. In a mechanism for controlling the flow of a fluid from a region of high pressure to a region of lower pressure, there being a passage connecting said regions: an outlet valve for controlling the flow of the fluid through said passage; diaphragm means spaced from but operatively connected to said valve for transmitting movement thereto, one side of said diaphragm means being exposed to the pressure of said higher region for urging the diaphragm in valve opening direction; means cooperating with the other side of said diaphragm means to define a control chamber, the pressure within said chamber urging the diaphragm in a direction to effect closing of said valve; means permitting the limited flow of fluid into said control chamber from said region of higher pressure; conduit means connecting said control chamber with the second mentioned region of pressure; a normally closed first valve for controlling said conduit means; means responsive to the differential of pressure between the second mentioned region of pressure and control chamber pressure for controlling said first valve for maintaining a substantially constant pressure differential between said control chamber pressure and the pressure of said second mentioned region when the pressure in said second region drops below a predetermined value; a spring biasing said outlet valve toward the closed position, said spring being adapted to yield to permit said outlet valve to open when the pressure of said higher region, acting on said diaphragm, exceeds the effective pressure urging the valve closed; a second valve for controlling said conduit means; and pressure sensitive means for controlling said second valve, said pressure sensitive means being responsive to the absolute pressure in said control chamber and adapted to cause said second valve to remain open and to maintain pressure in said control chamber at a substantially constant value when the pressure of said second region exceeds said predetermined value, and, when the pressure of said second mentioned region drops below said predetermined level, to close said second valve so as to permit said first mentioned valve to control the pressure in the control chamber and cause the pressure in the control chamber to be maintained at a substantially constant differential with relation to the pressure of said second mentioned region.

8. Control mechanism as defined in claim 7, wherein said pressure sensitive means comprises an evacuated bellows tending to open said second valve and a spring tending to close said valve in opposition to the action of said bellows; and means for adjusting the tension of said spring whereby to vary the absolute pressure at which said valve is adapted to close.

9. In a mechanism for controlling the flow of a fluid from a region of higher pressure to a region of lower pressure, there being a passage connecting said regions: a valve for controlling the flow of the fluid through said passage; diaphragm means connected to said valve for transmitting movement thereto, one side of said diaphragm means being exposed to the pressure of said higher region of pressure; means cooperating with the other side of said diaphragm means to define a control chamber; restricted orifice means for bleeding the fluid into said control chamber from said region of higher pressure; duct means connecting said control chamber with the second mentioned region of pressure; a first valve for controlling said duct means; means responsive to the pressure in said control chamber for controlling said first valve for maintaining the pressure in said control chamber at a substantially constant value when the differential of pressure between said control chamber pressure and the pressure of said second region is below a predetermined value; a spring for biasing said valve to the closed position, said spring being adapted to yield to permit said valve to open; and pressure sensitive means, including a second valve controlling said duct means, responsive to the differential in pressure of said control chamber over the pressure of said second mentioned region of pressure, adapted to cause said second valve to remain closed as long as the pressure differential between the control chamber and said second region is above said predetermined value, and, when pressure differential drops below said predetermined value to open so as to bleed off excess pressure in said control chamber over a predetermined differential between said control chamber pressure and the pressure of said second region.

10. In mechanism for controlling the pressure within an enclosure having an opening communicating with the exterior: valve means for controlling flow through said enclosure opening, said valve means being balanced between enclosure pressure and exterior pressure; a control chamber; a movable wall spaced from but operatively connected to said valve means, said movable wall being subjected on one side to the pressure in said control chamber and on the other side to enclosure pressure; and pressure control means for said control chamber, including pressure responsive means responsive to control chamber pressure and adapted to control the pressure in said control chamber.

11. In mechanism for controlling the pressure within an enclosure having an opening communicating with the exterior: valve means for controlling flow through said enclosure opening, said valve means being balanced between enclosure pressure and exterior pressure; a control chamber; a movable wall spaced from but operatively connected to said valve means, said movable wall being subjected on one side to the pressure in said control chamber and on the other side to enclosure pressure; and pressure control means for said control chamber, including pressure responsive means responsive to the differential between control chamber pressure and exterior pressure and adapted to control the pressure in said control chamber.

12. In mechanism for controlling the pressure within an enclosure having an opening therein: walls defining a control chamber; a movable pressure sensitive element subjected on one side to enclosure pressure and on the other side to chamber pressure; valve means for controlling the flow through the opening in the enclosure; means operatively connecting said movable pressure sensitive element in spaced relationship to said valve means; and pressure control means for said control chamber including pressure responsive means responsive to control chamber pressure adapted to control the pressure in said control chamber.

13. In mechanism for controlling the pressure within an enclosure: walls defining a pair of valve openings; a pair of valves supported for movement toward and from said openings; a control pressure chamber; a pressure sensitive element adapted to be exposed to enclosure pressure on one side and to chamber pressure on the other side; means for connecting said pressure sensitive element to said valves for moving said valves between open and closed position; and pressure control means for said control chamber including pressure responsive means responsive to chamber pressure adapted to control the pressure in said control chamber.

14. In a mechanism for controlling the pressure within an enclosure: walls defining a pair of spaced axially aligned valve openings; a pair of spaced axially aligned valves supported on a common stem for movement toward and from said openings; a control pressure chamber; a pressure sensitive element adapted to be exposed to enclosure pressure on one side and to chamber pressure on the other side; means for connecting said pressure sensitive element to said stem for moving said valves between open and closed position; and pressure control means for said control chamber including pressure responsive means responsive to chamber pressure adapted to control the pressure in said control chamber.

15. In mechanism for controlling the pressure within an enclosure: walls defining a pair of valve openings; a pair of valves supported for movement toward and from said openings; a control pressure chamber, a pressure sensitive element adapted to be exposed to enclosure pressure on one side and to chamber pressure on the other side; means for connecting said pressure sensitive element to said valves for moving said valves between open and closed position; and pressure control means for said control chamber including pressure responsive means responsive to differential between pressure within said enclosure and pressure exterior thereof and adapted to control the pressure in said control chamber.

16. In a mechanism for controlling the flow of fluid from a region of higher pressure to a region of lower pressure, means defining parallel passages for the flow of fluid between said regions, including a pair of partition walls having valve openings therein defined by valve seats in said walls, said passages being separated by an outflow compartment leading to said region of lower pressure, a pair of valve elements adapted to cooperate with said valve seats for controlling the flow of fluid through said openings, a diaphragm to which said valve elements are both connected for movement in unison therewith and with each other, one side of said diaphragm being exposed to the pressure of said region of higher pressure, means cooperating with the other side of said diaphragm to define a control chamber having an orifice adapted to permit flow of fluid into said control chamber from said region of higher pressure, pilot valve means for bleeding fluid from said control chamber to said region of lower pressure, and pressure responsive means responsive to pressure within said control chamber adapted to control said pilot valve to thereby control the pressure in said control chamber.

17. In mechanism for controlling the pressure within an enclosure having an opening communicating with the exterior; valve means for controlling flow through said enclosure opening, said valve means being balanced between enclosure pressure and exterior pressure; a control chamber; a movable wall spaced from but operatively connected to said valve means, said movable wall being subjected on one side to the pressure in said control chamber and on the other side to enclosure pressure; and pressure control means for said control chamber, including pressure responsive means having one side subjected to control chamber pressure and adapted to control the pressure in said control chamber.

JAMES M. KEMPER.

REFERENCES CITED

The following references are of record in the file of this patent:

UNITED STATES PATENTS

| Number | Name | Date |
|---|---|---|
| 220,202 | Wilder | Sept. 30, 1879 |
| 757,881 | Burke | Apr. 19, 1904 |
| 1,575,725 | Stewart | Mar. 9, 1926 |
| 1,904,475 | Kissing | Apr. 18, 1933 |
| 2,208,554 | Price | July 16, 1940 |
| 2,226,761 | Fox | Dec. 31, 1940 |
| 2,265,461 | Wagner | Dec. 9, 1941 |
| 2,307,199 | Cooper | Jan. 5, 1943 |
| 2,316,237 | Grunert et al. | Apr. 13, 1943 |
| 2,393,343 | Schroeder | Jan. 22, 1946 |
| 2,399,326 | Crot | Apr. 30, 1946 |
| 2,419,707 | Cooper et al. | Apr. 29, 1947 |

FOREIGN PATENTS

| Number | Country | Date |
|---|---|---|
| 521,623 | Great Britain | May 27, 1940 |